United States Patent [19]
Blair

[11] 3,826,326
[45] July 30, 1974

[54] THREE WHEELED AUTOMOTIVE VEHICULAR CONSTRUCTION

[76] Inventor: David Blair, 307 S. School St., Pittsburgh, Pa. 15202

[22] Filed: Nov. 9, 1971

[21] Appl. No.: 196,981

[52] U.S. Cl............ 180/25 R, 280/96, 280/96.2 R, 280/106 R
[51] Int. Cl........................................... B62d 61/06
[58] Field of Search.......... 180/25 R, 66 R, 73 C D

[56] References Cited
UNITED STATES PATENTS

| | | | |
|---|---|---|---|
| 1,121,256 | 12/1914 | Kelsey | 180/25 R |
| 1,238,732 | 9/1917 | Andrews | 180/25 R |
| 1,989,995 | 2/1935 | Martin | 180/25 R |
| 2,383,611 | 8/1945 | Marcy | 180/11 |
| 2,434,759 | 1/1948 | Donovan | 180/25 R X |
| 2,574,199 | 11/1951 | Tandler et al | 180/25 R |
| 2,681,117 | 6/1954 | Marcy | 180/66 R |
| 2,839,329 | 6/1958 | Wilfert | 296/28 K |
| 2,942,677 | 6/1960 | Gray | 180/66 R X |
| 2,966,951 | 1/1961 | Lang | 180/25 R |

Primary Examiner—David Schonberg
Assistant Examiner—Leslie J. Paperner
Attorney, Agent, or Firm—Green, McCallister & Miller

[57] ABSTRACT

An engine-energized fluid-motor-driven three-wheeled automotive vehicle utilizes a somewhat bottle-shaped continuous basic frame structure whose reduced front end part serves to mount a pair of wheels, a combustion engine and a fluid pump, and whose back end part serves to centrally carry a rear drive wheel and its actuating fluid motor. The construction provides a stable vehicle whose rear drive wheel motor assembly is resiliently positioned to absorb road shock.

20 Claims, 36 Drawing Figures

INVENTOR.
David Blair

INVENTOR.
David Blair

BY
Green, McCallister & Miller

HIS ATTORNEYS

INVENTOR.
David Blair
BY
Green, McCallister & Miller
HIS ATTORNEYS

INVENTOR.
David Blair

BY
Green, McCallister & Miller
HIS ATTORNEYS

THREE WHEELED AUTOMOTIVE VEHICULAR CONSTRUCTION

BACKGROUND OF THE INVENTION

1. Field of the Invention

This invention relates to an improved small automotive vehicular construction and particularly, to an improved frame structure and drive mechanism therefor. A phase of the invention deals with an improved method of making a frame structure for an automotive vehicle, and to a simple modular type of automotive vehicular construction.

2. Description of the Prior Art

Previous to the present invention, it has been customary in endeavoring to provide a relatively inexpensive and practical form of smaller commuting type of vehicle to merely reduce the relative size of the various parts including the frame, the wheels and the power of the gasoline combustion engine without in reality meeting the problem involved. At the present time, there are small foreign cars that have been produced with both rear and front mounting, small horsepower engines, some of which are water cooled and others of which are air cooled. All use a direct gasoline engine drive and all cost in the neighborhood of a couple thousand dollars, taking into consideration transportation costs, taxes, etc. The present invention has been devised to meet a need for a less expensive vehicle that will serve as a basic transportation unit and meet the need for a smaller but relatively comfortable and trouble-proof automotive vehicle.

SUMMARY OF THE INVENTION

It has thus been an object of the present invention to devise a new and improved type of vehicular transportation car or unit.

Another object has been to devise a motor driven automotive vehicle of improved simplicity that will be relatively maintenance free, much less expensive than so-called present day mini cars and that will employ fluid motor driving means.

Another object of the invention has been to devise new and improved procedure for making the frame structure for an automotive vehicle.

A further object has been to approach the construction and manufacture of an automotive vehicle from a new standpoint and to do so in a practical manner.

These and other objects of the invention will appear to those skilled in the art from the illustrated embodiment and the claims.

BRIEF DESCRIPTION OF THE DRAWINGS

And, FIG. 36 is a side view in elevation showing a hand brake assembly for the rear wheel of the vehicle.

DESCRIPTION OF THE PREFERRED EMBODIMENT

Summarized briefly, a three wheel automotive vehicle that may be used as a utility vehicle, a basic transportation vehicle or a sports vehicle, has been devised in accordance with the invention which utilizes a continuous base frame unit, a pair of front steering wheel assemblies G carried by an inwardly offset, somewhat rectangularly shaped front end portion of a unitary frame 15 (see FIG. 25), a central, backwardly positioned, driving wheel assembly E and a fluid motor F carried in a resilient, shock-absorbing relation by a swing frame or arm 70. An internal combustion or gasoline engine I is shown mounted between the wheels G at the front end of the vehicle and as coupled by a unit J to drive a variable displacement fluid pump K which has a greater capacity than and is connected by fluid lines to fixed displacement, fluid drive motor F that is utilized to actuate or drive the rear wheel. The speed of operation of the vehicle may be controlled by a conventional accelerator pedal operatively connected to the engine, and the power supplied may be controlled through valve means connected in the fluid lines between the fluid pump K and fluid motor F.

Figures 1, 2, 3, 4, 5, 6, 7, 8, 9, 10, 11:
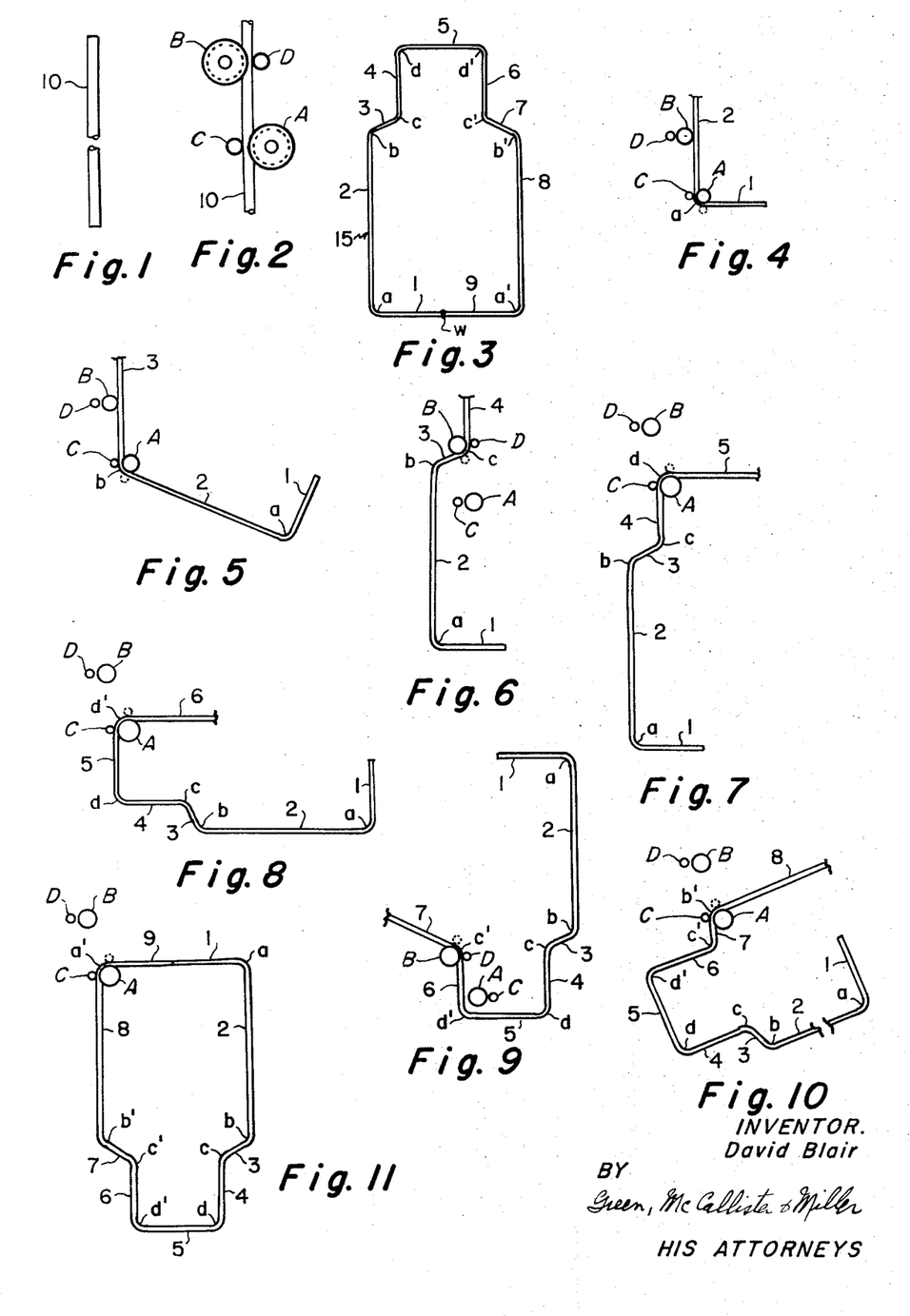
FIG. 1 is a longitudinal plan view of a single length of a metal tubing member or workpiece that may be utilized in forming a basic frame structure of the vehicle.
FIG. 2 is a plan view on the scale of FIG. 1 showing the workpiece inserted in a preliminary position ready for a first forming operation.
FIG. 3 is a reduced plan view showing various portions of a formed basic frame structure utilizing the metal workpiece or length of FIG. 1.
FIGS. 4 to 11, inclusive, are somewhat diagrammatic plan views on the scale of FIG. 3 illustrating step-by-step procedure in bend-forming or shaping the workpiece of FIG. 1 into a complete, somewhat bottle or demi-john shaped basic frame structure such as illustrated in FIG. 3.

Basic metal frame 15 (see FIG. 3) for the three wheel automobile or vehicle is shown constructed from a continuous metal workpiece 10 that may be a solid bar or rod, but is preferably of tubular construction. The frame 15 has a general bottle or demi-john shape, with a smaller rectangular front part and a larger rectangular back part, connected by diagonal or sloped shoulder portions 3 and 7. The frame 15 is manufactured from a workpiece 10 represented by a single length of metal material which is bent to shape with its ends terminating at the back end portion of the structure, and such ends are welded together by weld metal w to form a continuous, unitary, closed shape.

In forming the frame 15, as indicated in FIGS. 4 to 11 of the drawings, a pair of stationary, relatively large rolls A and B are provided in a fixed, spaced-apart and offset or staggered relation with respect to each other. A pair of smaller, active, forming or bending rolls C and D which are adapted to be moved into and out of various positions are used in operative association with the pair of larger fixed-position rolls A and B. The smaller rolls C and D are not only adjustable or movable with respect to the fixed-position, workpiece-positioning, larger rolls A and B, but are also movable, from the standpoint of their staggered or offset spaced-apart relation with respect to each other, into positions at which they have substantially the same spaced-apart relation with respect to each other. Each of the rolls A, B, C and D, in the sense of rotation, may be an idler roll, having no positively driven rotational actuation. However, the rolls C and D may be driven to facilitate their respective bend-producing movements. In these figures, the solid line positions of the rolls C and D represent their starting positions for a bending operation and the dotted line positions represent their positions on the completion of a particular bending operation.

The first step in forming a unitary frame 15 (see FIG. 2) is illustrated as involving placing a workpiece or length of material 10 in a longitudinally extending relation along and between a pass defined by the pair of larger rolls A and B. Thereafter, in a first forming step (see FIG. 4), the pair of smaller active, forming or bending rolls C and D is moved as a unit towards the roll A or the roll C is moved between its solid and dotted line positions to thus bend the workpiece length at substantially right angles and form a back leg portion 1 and a right or 90° angle or bend $a$ between the back leg portion 1 and a relatively long side leg portion 2. After accomplishing this 90° bend, the pair of active smaller rolls C and D is then moved backwardly to permit the workpiece or length of material 10 to be advanced. In the next or second forming step (see FIG. 5), the piece 10 is placed at an advanced location between the positioning rolls A and B, and the pair of smaller forming rolls C and D are moved towards the large roll A or the roll C is moved between its solid and dotted line positions to form an angle or bend $b$ of about 67° to complete the forming of the longer side leg portion 2 and initiate the forming of a diagonal leg or shoulder portion 3. In the third forming step, a corner or angle $c$ is provided by moving the pair of small rollers C and D towards the roll B or by moving the roll D between its solid and dotted line positions to form a 67° angle (see FIG. 6) between shoulder or leg portion 3 and a preliminarily formed, relatively short length, side leg portion 4; this angle corresponds in angularity to the angle or bend $b$.

In the fourth forming step, a straight-length portion of the piece 10 is placed in a further advanced longitudinal or vertical alignment between the rolls A and B (see FIG. 7), and the small pair of rolls C and D are then moved towards the roll A or the roll C is moved between its solid and dotted line positions until a 90° angle $d$ is provided to complete the forming of leg portion 4 and initiate the forming of a transverse cross-extending front leg portion 5.

In the fifth forming step (see FIG. 8), the rolls C and D are moved towards an advanced length portion of the workpiece 10 or the roll C is moved between its solid and dotted line positions to form a 90° shoulder $d'$ to complete the front cross leg portion 5 and initiate the forming of short, side leg portion 6. It will be noted that side leg portion 6 corresponds to and has an opposed spaced-apart relation with respect to short-length side leg portion 4.

In the fifth to eighth forming steps (see FIGS. 8 to 11), the steps of FIGS. 4 to 7 are repeated to complete the shaping of an enclosed frame structure. In the sixth forming step, the forming of short side leg portion 6 is completed (see FIG. 9) by moving the small rolls C and D outwardly towards the fixed roll B or the roll D is moved between its solid and dotted line positions to provide the 67° angle $c'$. In the seventh forming step (see FIG. 10), the forming of a second shoulder or diagonal leg portion 7 is completed by again moving the small pair of rolls C and D towards the first roll A or the roll C is moved between its solid and dotted line positions to provide a 67° angle or corner $b'$. In the eighth forming step (see FIG. 11), the forming of longer side leg portion 8 and of back end cross-extending leg portion 9 is completed by providing a 90° angle or corner $a'$. This is accomplished by either moving the rolls C and D towards the roll A or moving the roll C between its solid and dotted line positions. The workpiece 10 is now represented by a continuous closed shape 15, with its adjoining back ends being beveled and secured together by weld metal $w$ (FIG. 3).

Figure 12:
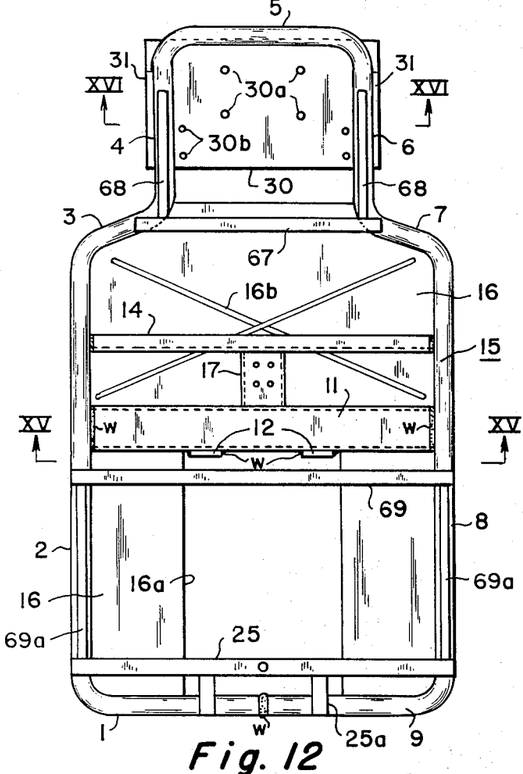
FIG. 12 is an enlarged top plan view showing the unitary, continuous, basic frame structure of FIG. 3 as reinforced and supplemented by additional members utilized in completing its construction.
Figure 13:
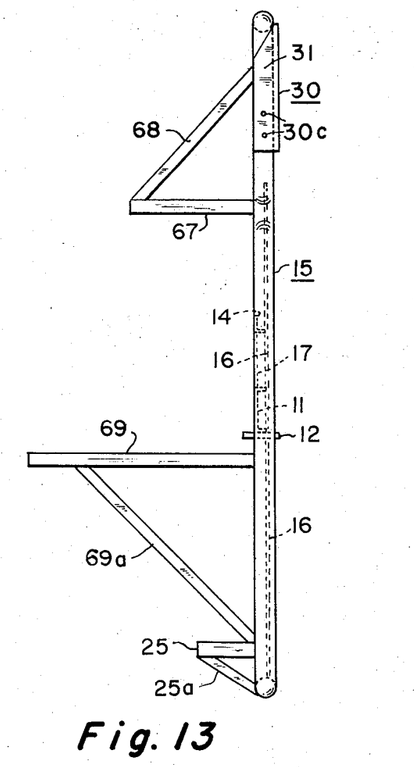
FIG. 13 is a side view in elevation on the scale of and of the frame structure shown in FIG. 12.
Figure 15:
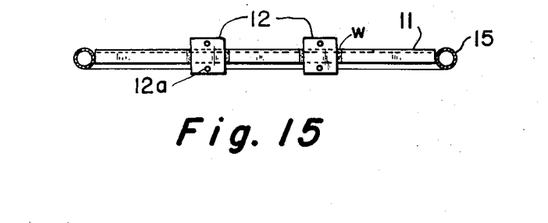
FIG. 15 is a transverse or endwise section in elevation on the scale of and taken along the line XV—XV of FIG. 12.
Figure 16:
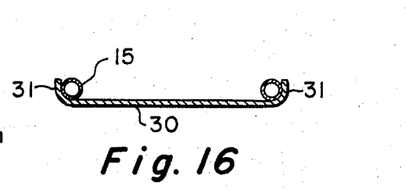
FIG. 16 is a transverse or endwise section in elevation on the scale of and taken along the line XVI—XVI of FIG. 12.
Figure 24:
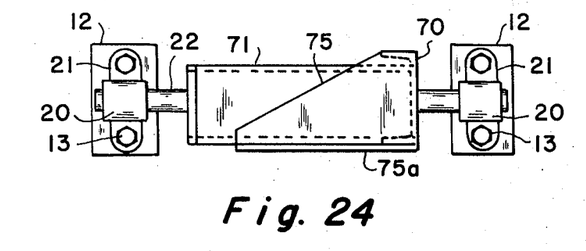
FIG. 24 is a back end view in elevation on the scale of FIGS. 21 to 23 and showing an end elevation of the swing frame.
Figure 25:
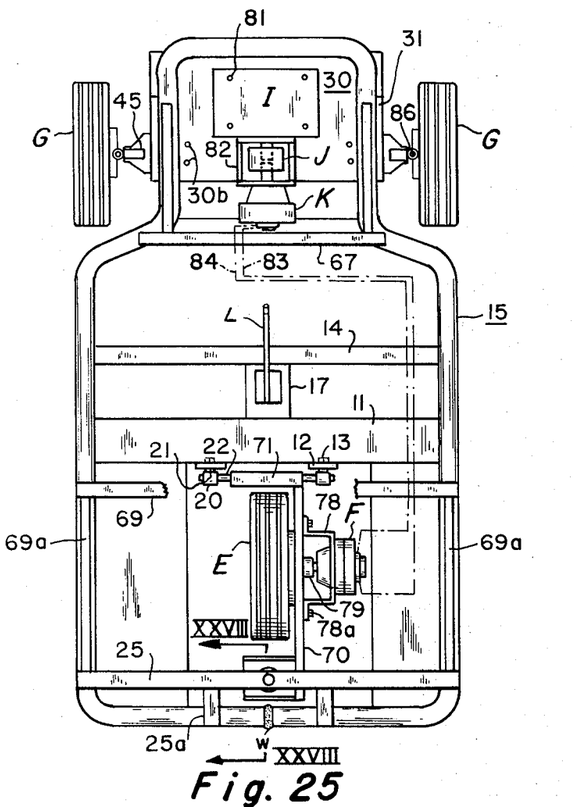
FIG. 25 is a top plan view on the scale of FIG. 12 showing operating parts of the vehicle in a mounted position with respect to the frame structure.
Figure 26:
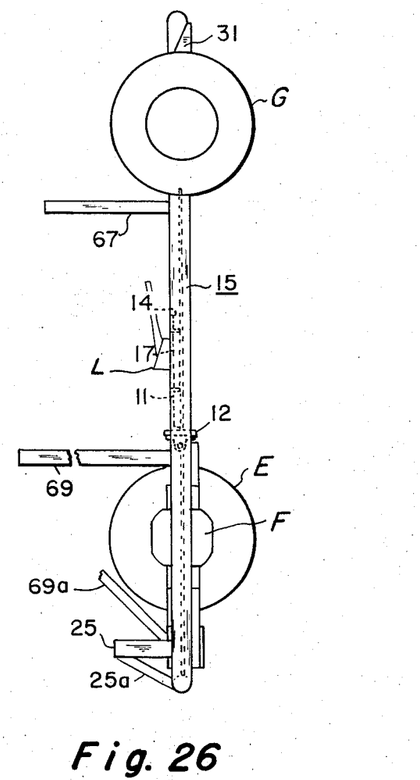
FIG. 26 is a side elevation on the scale of and showing the structure of FIG. 25.

As shown in FIGS. 12 and 13, a cross-extending, reinforcing and substantially mid-positioned, inverted channel member 11 is secured between opposed, longer-length side leg portions 2 and 8, as by weld metal $w$, to provide a mounting support for a rear, driving wheel assembly E (see FIG. 25). A pair of transversely spaced-apart, upright, mounting plates or pieces 12 are secured by weld metal $w$ to the back side flange of the cross member 11, as also shown in FIG. 15, to serve in mounting the brake and drive wheel assembly E and the fluid motor F to extend backwardly therefrom. Each mounting piece 12 has a pair of threaded holes or bores 12a therein for securing a pair of backwardly extending, shaft-mounting clevises 20 thereon by means of bolts 13 (see FIGS. 24 and 25). As also shown, each clevis 20 has a pair of oppositely extending mounting lugs 21 which are bored to carry the bolts 13. A cross-extending, horizontally positioned, king or pivot mounting pin 22 is carried between the clevises 20 and is adapted to swingably receive a swing collar 71 that is secured on a forward end of channel-shaped, longitudinally extending, wheel-mounting, swing arm member or frame 70.

The front end of the frame 15 is reinforced by a bow-shaped member 67 that is secured to the diagonal portions 3 and 7, separates the engine compartment from the passenger part of the vehicle, and has a pair of forwardly extending diagonal, bracing, side leg members 68. A front base plate or platform member 30 is secured along the underside of the leg portions 4, 5 and 6 to provide a mounting structure for the engine I and fluid pump K. Holes 30a are adapted to receive engine and pump mounting bolts, and holes 30b are adapted to receive wheel assembly mounting bolt and nut assemblies (see FIGS. 12 and 17). Intermediate and rear parts of the frame 15 have a central floor plate 16 for the passenger and rear compartments that is weld-secured between the leg portions 2, 8, 1 and 9, has cross-extending reinforcing rib portions 16b, and is secured to the underside of a cross-extending angle-shaped cross-bar member 14 and to the cross-extending channel member 11. The floor plate 16 is centrally cut-out at 16a to provide an open portion for the rear wheel and fluid motor assemblies E and F.

Figure 14:
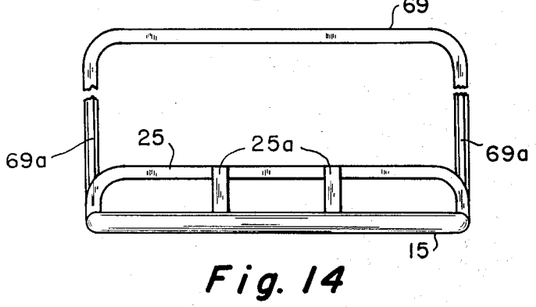
FIG. 14 is a back end view in elevation on the scale of FIG. 12.

The back drive wheel compartment of the vehicle has a bow-shaped, reinforcing cross member 69 that serves to separate the passenger compartment from the rear compartment. The member 69 is reinforced by a pair of backwardly declining, diagonal side leg members 69a. A second, lower profile bow-shaped, cross-extending, reinforcing, upright member 25 of box-like section (see FIG. 28) is secured at the rear end of the frame 15 to the side legs 2 and 8. Spaced-apart, backwardly declining, diagonal, back legs or pieces 25a (see FIGS. 12, 13 and 14) extend from the member 25 and are secured between it and the back leg portions 1 and 9 of the frame 15. A centrally positioned, downwardly open channel piece or member 17 is securely connected between the cross member 11 and a reinforcing angle-shaped cross bar member 14. The member 14 is secured between the legs 2 and 8 of the frame 15 and the member 17 serves as a mount for a hand brake L (see FIGS. 25 and 36).

Figures 21, 22, 23:
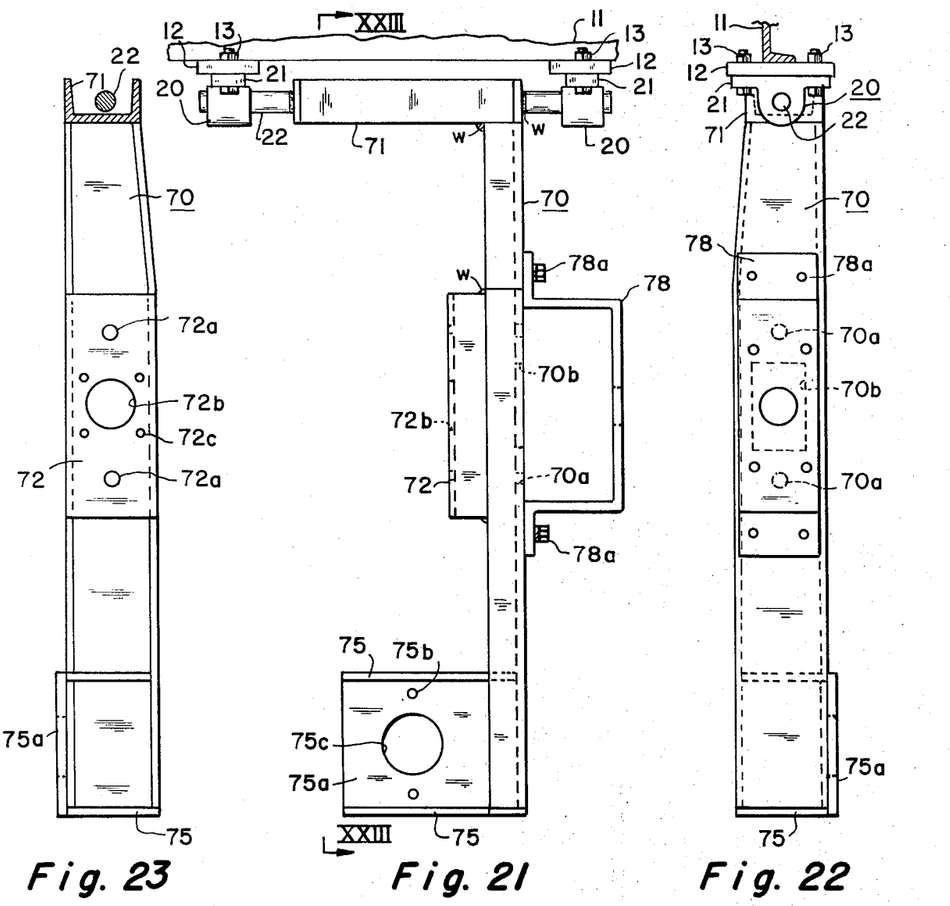
FIG. 21 is a top plan view on the scale of FIGS. 17 to 20, illustrating a rear swing frame for mounting a rear drive wheel assembly of the vehicle.
FIG. 22 is an outer side view in elevation on the scale of and of the swing frame of FIG. 21.
FIG. 23 is a side view and section in elevation on the scale of and taken along the line XXIII—XXIII of FIG. 21.
Figure 27:
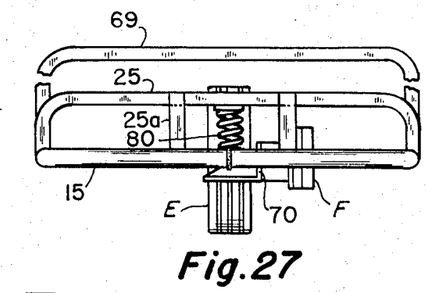
FIG. 27 is an end view in elevation on the scale of and illustrating the structure of FIG. 25.
Figure 28:
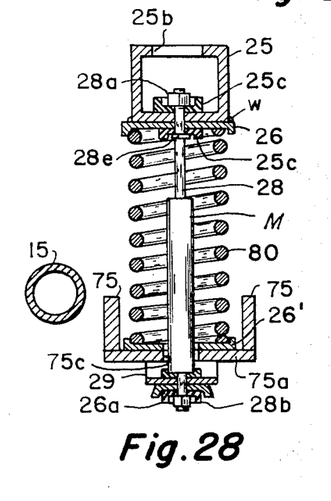
FIG. 28 is an enlarged fragmental side section taken along the line XXVIII—XXVIII of FIG. 25, showing a resilient back end mounting of the swing frame for the rear wheel, and particularly illustrating rear shock absorbing and spring positioning means therefor.
Figure 29:
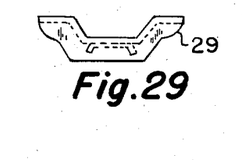
FIG. 29 is an enlarged end view in elevation particularly illustrating a lower mounting bracket for the spring of FIG. 28.

As shown particularly in FIGS. 21 to 24, the wheel mounting swing arm member 70, at its back end, has a triangular-cut, channel piece 75 welded to extend transversely therefrom to provide a rear coil spring mount (see also FIGS. 27 and 28). A short-length, rectangular or box-shaped brake shoe mounting member 72 faces inwardly and is secured along one wide side wall of and somewhat intermediate the length portion of the arm 70 by weld metal $w$. As shown in FIG. 21, the box-like mounting member 72 has pairs of threaded bolt receiving bores or holes 72c therein for mounting a brake shoe mechanism of drive wheel assembly E thereon, see also FIG. 23. The arm 70 has a rectangular opening 70b therein and the box-like mounting member 72 has an aligned, large, circular opening 72b therein to bypass a shaft that carries rear brake and wheel assembly E and that is driven by variable speed fluid motor assembly F. An aligning pair of holes 70a and 72a are provided in the members 70 and 72 for bypassing a brake nut adjusting socket wrench therethrough.

FIGS. 27 and 28 show how the back end portion of the swing support arm 70 is resiliently mounted with respect to the frame 15. The cross-extending, angle-shaped, box-like, back end member 25 has a centrally disposed, upwardly open cut 25b that is adapted to receive an upper, threaded, bolt-receiving end of a piston rod 28 of a shock absorber M which, for example, may be a Monroe-matic No. 22,629. The rod 28 is threaded at its opposite ends to receive nuts 28a and 28b and to mount the shock absorber M between the channel piece 75 of the swing arm 70 and the cross-extending member 25. An upper flanged plate 26 is weld-secured to the underside of the member 25 and a lower flanged plate 26' is weld-secured to the channel piece 75 to mount or position a spring helix 80 therebetween. The upper cut 25b, in combination with an under-positioned cup 25c that is positioned between the under face of the flanged plate 26 and a collar 28e on the rod 28, mount the upper end of the rod with respect to the member 25. The lower end of the rod 28 is mounted on a connecting web 75a between wings or flanges of the member 75 by a bracket 29, an associated washer and cup assembly 26a, and nut 28b.

Referring particularly to FIG. 25, a fixed displacement fluid motor F is shown mounted on a U-shaped bracket 78 which is secured by bolts 78a to the backwardly extending swing arm member 70. A suitable flexible coupling 79, such as of a Dodge type No. 79 may connect the shaft of the fluid motor F to an axially aligned shaft portion of the wheel assembly E. A suitable relatively lower-power, gasoline-conserving, internal combustion engine I, such as a Briggs and Stratton 10 to 14 horsepower, four cycle gasoline engine series No. 300420 or 320420, or an Onan (Studebaker Industries) two cylinder outline engine, model CCKB, with a 3 inch piston stroke, having twenty horsepower at 3,900 rpm and a 7 to 1 compression ratio, may be secured by bolts 81 to the mounting plate 30. A Hydro-Power (Automation Equipment, Inc.) variable displacement pump K, produced as Marshallmatic Model 10, is suitable and may be mounted on the plate 30 by a mounting spacer or Dutchman assembly 82 (see also FIGS. 34 and 35), with its drive shaft in alignment with a coupling J, such as a Dodge Permaflex type No. 1610 which is driven by the shaft of the engine unit I. Fluid connections 83 and 84 (see FIG. 25) extend from the pump K to the fluid motor F for actuating it and, in turn, actuating the wheel of the wheel assembly E. The motor may be a HydroPower, fixed displacement type, Marshallmatic Model 10.

Figure 17:
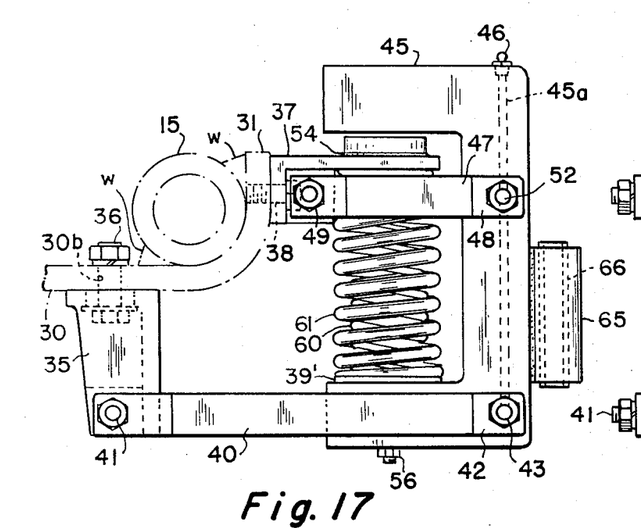
FIG. 17 is a greatly enlarged end fragment in elevation taken from the right side of the structure of FIG. 25 and illustrating a coil spring mounting assembly for each of a pair of front wheel assemblies of the vehicle on and with respect to the basic frame structure.
Figure 18:
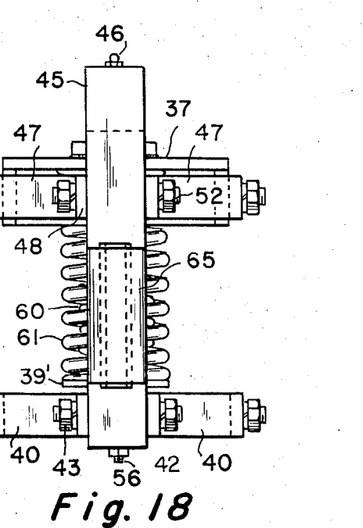
FIG. 18 is a side view in elevation on the scale of and showing the mounting assembly of FIG. 17.
Figure 19:
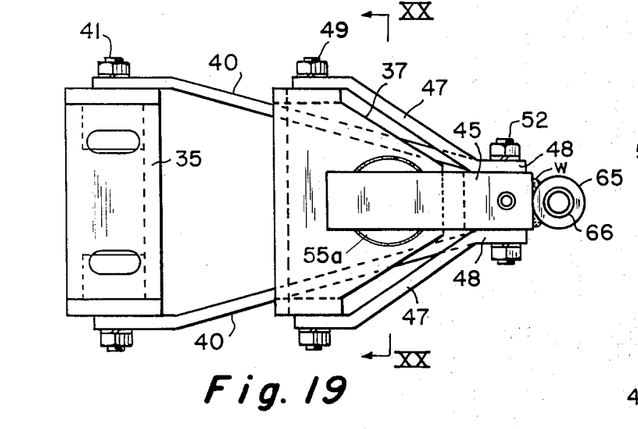
FIG. 19 is a top plan view on the scale of and of the view of the assembly shown in FIG. 17.

In FIGS. 17, 18 and 19, front wheel mounting assemblies are shown. The mounting plate member 30 has an outer, upwardly extending flange 31 at each end thereof which is secured by weld metal w to the frame 15 for carrying a wheel mount. A vertical mounting or leg bracket 35 is secured by a pair of nut and bolt assemblies 36 that extend through holes 30b in the plate member 30 to carry a cross or through-extending, nut-mounted, pivot pin assembly 41 thereon to pivotally carry a pair of forwardly, outwardly covering, opposed, under-positioned, wheel spindle leg support arms or parts 40 thereon. As shown particularly in FIGS. 17 and 19, the forward ends of the pair of arms 40 terminate in a pair of planar mounting portions 42 which are parallel with similar portions 48 of an upper pair of support arms or leg parts 47 and are secured to a lower leg portion of a U-shaped wheel supporting spindle and spring mounting bracket 45 by a front pivot pin, nut and lock washer assembly 43. It will be noted that the pair of arms 40 extend substantially in line with respect to the lower, inwardly extending foot of the support bracket 45.

Each side flange portion 31 of the plate 30 carries an upper, forwardly horizontally extending, mounting or leg bracket 37 that is secured thereon by a pair of bolts 38, see particularly FIG. 17. As shown in FIG. 19, the bracket 37 has a back mounting flange and a pair of side flanges and is complementary in shape with the upper pair of support arms 47. U-shaped support bracket 45, adjacent the upper portion of its vertical leg and beneath its upper, inwardly extending foot, carries flattened front end portions 48 of the pair of upper support arms 47 by means of a front pivot pin, nut and lock washer assembly 52 that is similar to the assembly 43. It will be noted that the arms 47 at their back end portions are planar and receive a cross-extending pin shaft and nut assembly 49; they are mounted in a suitable spaced and pivoted relation on side flanges of the bracket 37.

Figure 20:
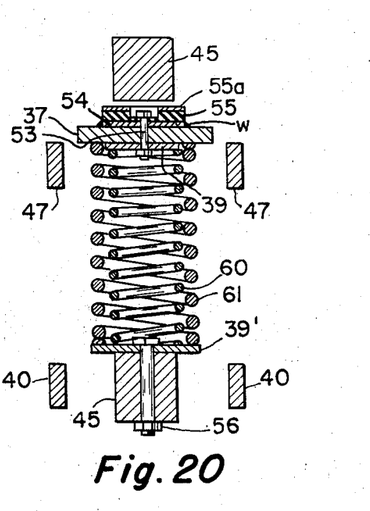
FIG. 20 is a sectional view in elevation on the scale of and taken along line XX—XX of FIG. 19.

A dual, helical, shock absorber coil spring assembly having inner and outer, vertically extending springs 60 and 61 (see FIGS. 17 and 20) is provided for each front wheel assembly. The front end of the inner spring 60 is secured or mounted on under-positioned washer 39 that is carried by the web portion of the upper bracket 37. The upper end of the outer spring 61 is secured to the underside of the web portion of the bracket 37 in a concentric relation about the inner spring 60. The upper washer 39 is shown in FIG. 20 as secured to the web portion of the upper bracket 37 by a through-extending nut and bolt assembly 53 which, at its upper end, extends through a washer 54 that is welded to the upper side of the web portion of the upper bracket 37 and carries a bumper assembly which includes a hard rubber pad 55 and an upper reinforcing metal facing element or washer 55a. The lower end of the inner spring 60 is secured on a flanged washerlike member 39' that is removably secured to the lower, backwardly extending foot of the U-shaped wheel mounting bracket or spindle 45 by a nut and bolt assembly 56. It will be noted that the washer 39' also carries the lower end of the outer helical spring 61.

As particularly shown in FIGS. 17 and 19, the joints represented by the pin assemblies 43 and 52 are lubricated through the agency of a vertically extending lubrication bore hole 45a in the wheel spindle 45 that is closed at its upper end by a lubrication fitting 46. Also, the vertical leg portion of each spindle 45 has a vertically extending, cylindrical, king pin mounting sleeve 65 that is weld-secured to project outwardly therefrom. A conventional wheel-mounting spindle assembly H (see FIG. 25) is carried by an inner bushing 66 of the mount 65 to, in turn, carry a wheel assembly G.

Figure 30:
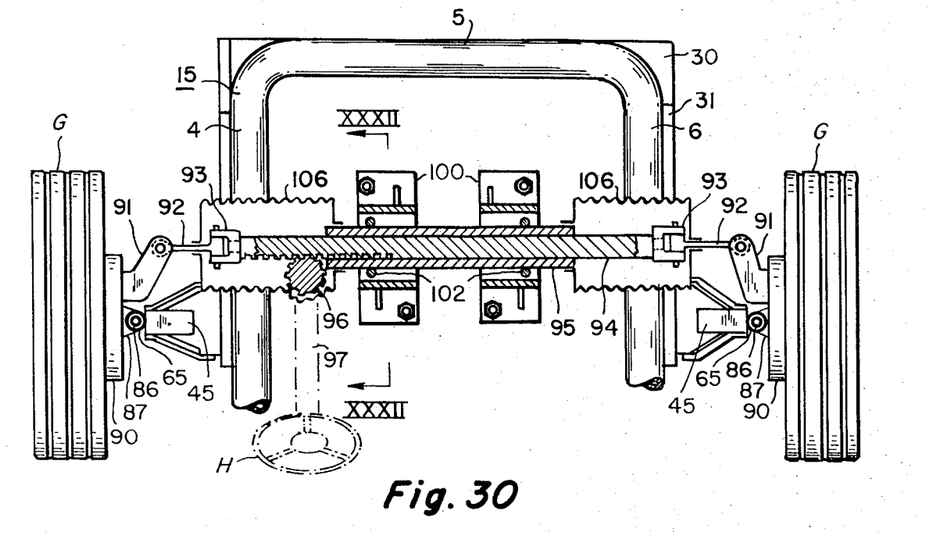
FIG. 30 is an enlarged horizontal front end section broken-away to particularly illustrate a steering mechanism for the vehicle.
Figure 31:
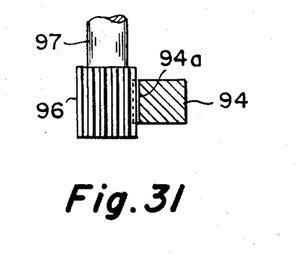
FIG. 31 is a further enlarged fragmental detail of steering column and gear parts of the structure of FIG. 30.
Figure 32:
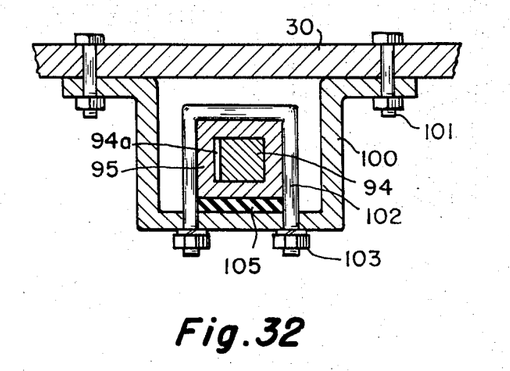
FIG. 32 is a greatly enlarged vertical fragmental section taken along the line XXXII—XXXII of FIG. 30.

Referring particularly to FIGS. 30 to 32, inclusive, front wheel assemblies G which include the usual tire, a wheel and rim on which the tire is mounted, and a stationary, back-positioned, mounting plate or disc part 90, is shown as constructed for steering the vehicle through the agency of a steering wheel H and column 97. The usual wheel mounting hub (not shown) is carried by the mounting plate 90. Each wheel plate 90 has a backwardly extending angle-shaped connecting arm 91 that is pivotally connected at its inner end to a connecting rod 92. A knuckle and universal joint 93 connects the inner end of each rod 92 to an associated outer end of a rectangular-shaped rack member 94. The wheel assembly G is shown pivotally carried by a spindle pin 86 (see FIG. 30) which is carried within a pair of vertically spaced-apart mounting lugs 87 that are secured to project inwardly from the mounting plate 90 above and below the spindle mount 65. As shown particularly in FIGS. 17 to 19, the pin 86 is journaled within the spindle mount 65.

With particular reference to FIGS. 30 and 31, the steering column 97 has a pinion 96 at its lower end that meshes with teeth 94a of the rack 94 in such a manner that a turning of the column 92 in either direction will cause a corresponding left or right-hand movement of the rack 94 and a corresponding turning of the wheel assemblies G. As shown particularly in FIGS. 30 and 32, the rack 94 is slidably carried within a boxlike sleeve 95 for movement therealong. The sleeve 95 (see FIG. 32) has a rectangular section that corresponds to the section of the rack 94. A pair of mounting brackets 100 of boxlike U-shape are employed in a transversely spaced-apart relation in cooperation with a pair of U-bolts 102 for positioning or mounting the sleeve 95. Each bracket 100 is secured by bolt and nut assemblies 101 to project downwardly from the engine mounting plate member 30. Each U-bolt 102 is secured in place by a nut and washer 103 on each of its threaded ends, and is adapted to project through the downwardly offset wall portion of an associated bracket 100 to extend about the sleeve part 95 and retain a resilient or rubber-like pad-like insert 105 in position between the sleeve 95 and the inner side of the bottom wall of the bracket 100. The pad or insert 105 may have about one-half an inch thickness and is compressed in position to about one-eighth of an inch thickness to serve as a resilient mounting means for the rack 94 and its supporting sleeve 95. To protect the operating parts and particularly the connector and knuckle assembly 93 at each end of the rack 94 from slush, dust and dirt, a bellowslike boot 106 of suitable material such as rubber or fabric-reinforced rubber is shown provided in FIG. 30 to extend along and cover not only the joint 93, but also the meshing gear portions that are particularly illustrated in FIG. 31.

Figure 33:
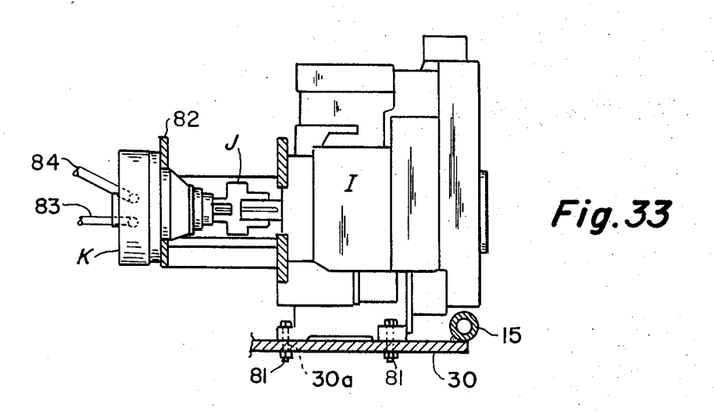
FIG. 33 is a slightly enlarged side view in elevation showing an internal combustion engine and its shaft coupled to a variable displacement pump; all are shown in FIG. 25 as mounted on the front end of the vehicular frame.
Figure 34:
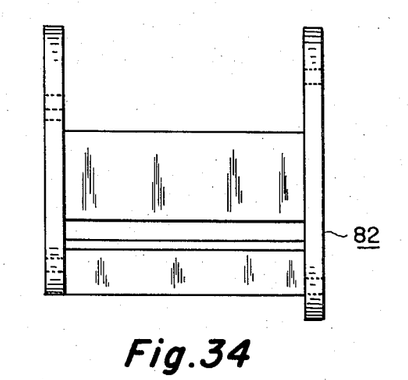
FIG. 34 is an enlarged side view in elevation and particularly showing a mounting spacer structure or Dutchman that is positioned between the engine and pump of FIG. 33 to support a coupling.
Figure 35:
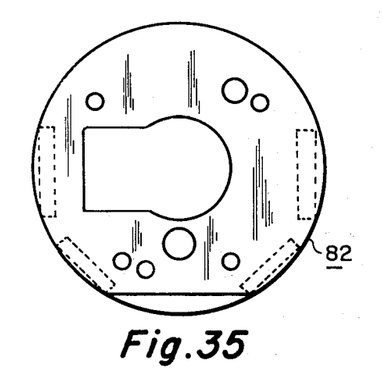
FIG. 35 is an end view in elevation on the scale of and taken at right angles to and showing the structure of FIG. 34.
Figure 36:
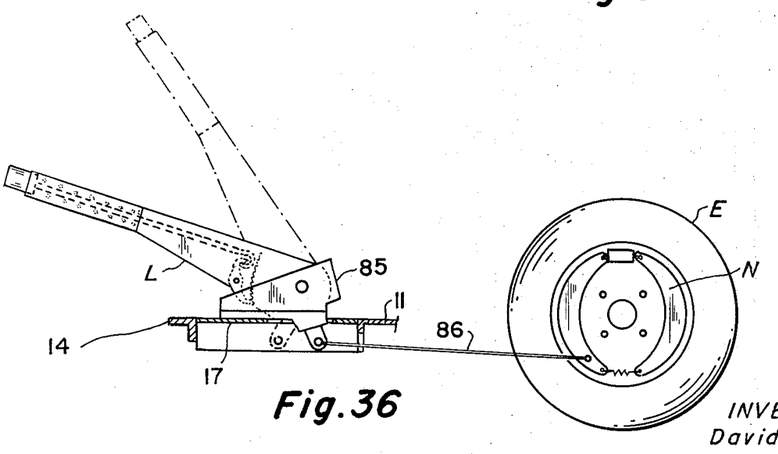

FIGS. 33, 34 and 35 show details of the construction and mounting of the internal combustion engine I, of the variable displacement fluid pump K as well as of the coupling J there-between, and of the Dutchman 82 that serves as positioning mounting between the units I and J. FIG. 36 somewhat diagrammatically shows a manual brake lever and operating system that may be employed in connection with the rear wheel assembly E. As shown, this includes a spring-released and ratchet-position-maintained operating lever L which is swingably secured by a bracket 85 on the channel piece 17. The lever L operates a brake rod 86 that is operatively connected to a conventional brake shoe assembly N that is an operative part of the wheel assembly E.

An important feature of the invention is the flexibility of mounting of drive means for the vehicle which is made possible by incorporating the combustion engine I with the fluid pump K, and utilizing a fluid motor F at a suitable remote location for substantially directly driving the vehicle through the agency of fluid lines or connections between the motor and the pump. The fluid agency may be any suitable fluid such as oil, etc. The limitations heretofore encountered in connection with the use of a mechanical drive shaft have been eliminated. Also, the concept of providing means that makes possible the unitized mounting of the road-engaging drive wheel means E and the driving fluid motor F therefor is important. Such a unit is flexibly mounted with respect to the vehicular frame 15 and flexible connecting lines 83 and 84 permit both the direct drive and the power generating units to be spring-suspended as separate units that can be positioned at locations on the frame that are most suitable for the particular type of vehicle. Such a split type of system totally eliminates mechanical shafting, the offsetting of the frame parts that is required in connection therewith, and complications as to mechanical connections and positioning that are involved where, for example, a backwardly positioned drive wheel is to be centered with respect to a pair of frontwardly positioned guide wheels. In addition to giving extreme flexibility of design, such a split propulsion system is conducive to a simplified controlling of the application of variable power and of the speed of a vehicle.

Incidentally, the drive connection between the fluid motor F and the drive wheel E, instead of being a conventional coupling such as 79, may make use of a pair of substantially complementary sleeves, one carried by the shaft of the drive wheel and the other carried by the shaft of the fluid motor. The sleeves will be of substantially frusto-conical shape with a complementary interfitting relationship that will provide an automatically aligned drive connection between the parts.

I claim:

1. In an improved chassis for an automotive vehicle, cross-extending front and back leg members with said back leg member being of greater length, a first pair of transversely spaced-apart and opposed shorter side leg members connected at their forward ends to opposite ends of said front leg member, a pair of transversely spaced-apart and opposed longer side leg members, a pair of angle-shaped shoulder members connecting back ends of said pair of shorter length side leg members in a transversely inwardly offset relation with front ends of said pair of longer side leg members, back ends of said pair of longer leg members being connected to opposite ends of said longer cross-extending back leg member, said leg members defining a unitary frame, a pair of front wheel assemblies one for each side of the chassis, spring and spindle means mounting each of said front wheel assemblies adjacent to and on an associated one of said shorter pair of side leg members, a cross-extending support member between said pair of longer leg members, a swing frame, means swingably mounting said swing frame on said cross-extending support member, shock-absorbing means operatively positioned between said swing frame and a back end portion of said frame, an engine and a fluid pump operatively mounted between said first pair of leg members, said pump being operatively connected to said engine for actuation thereby, a rear wheel assembly carried by said swing frame, and a fluid motor on said swing frame and operatively connected to said fluid pump for driving said rear wheel assembly.

2. In an improved chassis as defined in claim 1, said rear wheel assembly having brake drum and shoe means, and brake lever means being mounted on said frame and operatively connected to said brake shoe means.

3. In an improved chassis as defined in claim 1, said cross-extending support member being secured to said pair of longer leg members substantially midway of their length, a second cross-extending support member extending across between said pair of longer leg members adjacent to and upwardly above said back leg member, and said shock-absorbing means being mounted on said second support member substantially centrally thereof.

4. In an improved chassis as defined in claim 1, a wheel mounting bracket extending outwardly from the side of each of said shorter length leg members and carrying an associated said spring and spindle means.

5. In an improved chassis as defined in claim 1, said leg members of said frame being of hollow tubular metal construction, and said shoulders defining an angular relation with respect to the side leg members between which they are respectively connected of about 67°, said front leg member having an angular relation with respect to said shorter pair of leg members of about 90°, and said back leg member having an angular relation with respect to said pair of longer side leg members of about 90°.

6. In an improved chassis as defined in claim 1, a front mounting platform secured to and extending across between said shorter length pair of side leg members, and said engine and pump being operatively mounted on said platform.

7. In an improved chassis as defined in claim 1, transversely extending sleeve means mounted on said shorter length pair of side leg members, a steering rack operatively positioned to extend transversely across between said shorter length pair of leg members for operative movement within said sleeve means, compressible resilient means along said sleeve means, means securing said sleeve means with said resilient means in compression on said shorter length pair of leg members, means for moving said rack transversely within said sleeve means, and universal knuckle and joint means connecting opposite ends of said rack to each of said front wheel assemblies for effecting steering movement thereof.

8. In an improved chassis as defined in claim 1, said leg and shoulder members being a continuous one piece of metal whose opposite ends terminate at and are integrally secured together to provide the unitary frame.

9. In an improved chassis as defined in claim 8, said opposite ends terminating at and being secured together to define said back leg member.

10. In an improved chassis as defined in claim 1, bow-shaped members extending transversely across said unitary frame in a longitudinally spaced-apart relation with respect to each other and defining engine, passenger and back compartment areas along said frame.

11. In an improved chassis as defined in claim 10, a pair of diagonal members for each of said bow-shaped members, and each pair of said diagonal members being secured between its associated said bow-shaped member and an associated leg member.

12. In an improved chassis as defined in claim 1, said engine and fluid pump having a common drive connection and being mounted as a unit between said shorter length pair of side leg members, and said fluid motor and said rear wheel assembly being carried by said swing frame in a centrally positioned balanced relation with respect to said frame.

13. In an improved chassis as defined in claim 12, said fluid motor and said rear wheel assembly having drive shafts in axial alignment with respect to each other on said swing frame.

14. In an improved chassis as defined in claim 1, steering means mounted on said unitary frame and operatively connected to said pair of front wheel assemblies.

15. In an improved chassis as defined in claim 14, said rear wheel assembly having brake drum and shoe means, and brake lever means mounted on said unitary frame and operatively connected to said brake shoe means.

16. In an improved chassis as defined in claim 14, said steering means having a steering wheel, a cross-extending steering rack and connecting rods at each end of said rack, each of said rods being connected to an associated one of said front wheel assemblies for moving it in accordance with the movement of said rack, and said steering wheel having gear means meshing with said rack for actuating it.

17. In an improved chassis as defined in claim 1, said front wheel assemblies being mounted on said shorter length side leg members within sidewise inwardly offset spacing provided by said shorter length leg members in advance of said shoulders, and a wheel carried by each of said front wheel assemblies.

18. In an improved chassis as defined in claim 17, each of said front wheel assemblies having a U-shaped support bracket provided with a pair of horizontally extending vertically spaced-apart feet and a connecting vertical leg, and arms pivotally mounting each of said support brackets on and with respect to an associated side leg member of said shorter length pair.

19. In an improved chassis as defined in claim 18, each of said front wheel assemblies having a coil spring carried by the associated said support bracket and resiliently swingably mounting said bracket in cooperation with said arms on and with respect to the associated said leg member of said shorter length pair.

20. In an improved chassis as defined in claim 19, a wheel spindle receiving collar carried by each of said support brackets.

* * * * *